United States Patent
Watanabe

(10) Patent No.: US 11,829,357 B2
(45) Date of Patent: Nov. 28, 2023

(54) ANALYSIS ASSISTANCE DEVICE, ANALYSIS ASSISTANCE METHOD AND NON-TRANSITORY COMPUTER READABLE MEDIUM STORING ANALYSIS ASSISTANCE PROGRAM

(71) Applicant: SHIMADZU CORPORATION, Kyoto (JP)

(72) Inventor: Satoru Watanabe, Kyoto (JP)

(73) Assignee: Shimadzu Corporation, Kyoto (JP)

(*) Notice: Subject to any disclaimer, the term of this patent is extended or adjusted under 35 U.S.C. 154(b) by 0 days.

(21) Appl. No.: 17/230,698

(22) Filed: Apr. 14, 2021

(65) Prior Publication Data

US 2021/0334271 A1 Oct. 28, 2021

(30) Foreign Application Priority Data

Apr. 24, 2020 (JP) ................................. 2020-077306

(51) Int. Cl.
- *G06F 16/00* (2019.01)
- *G06F 16/245* (2019.01)
- *G06F 16/248* (2019.01)

(52) U.S. Cl.
CPC .......... *G06F 16/245* (2019.01); *G06F 16/248* (2019.01)

(58) Field of Classification Search
CPC .............................. G06F 16/245; G06F 16/248
USPC ................................................ 707/600–899
See application file for complete search history.

(56) References Cited

U.S. PATENT DOCUMENTS

| 5,209,853 | A | 5/1993 | Lynch et al. |
| 8,515,685 | B2* | 8/2013 | Denny ................ H01J 49/0036 703/2 |
| 11,244,818 | B2 | 2/2022 | Abramovitch |
| 2013/0123126 | A1* | 5/2013 | Collins .................. G16H 20/10 506/10 |
| 2013/0275439 | A1* | 10/2013 | Minvielle .......... G06F 16/3334 707/748 |

(Continued)

FOREIGN PATENT DOCUMENTS

| CN | 101695480 A | 4/2010 |
| CN | 107110835 A | 8/2017 |

(Continued)

OTHER PUBLICATIONS

Commonly Owned-Copending U.S. Appl. No. 17/230,723, filed Apr. 14, 2021.
Commonly Owned-Copending U.S. Appl. No. 17/230,745, filed Apr. 14, 2021.

(Continued)

*Primary Examiner* — Michelle N Owyang
(74) *Attorney, Agent, or Firm* — Renner, Otto, Boisselle & Sklar, LLP

(57) ABSTRACT

An analysis assistance device includes an estimator that estimates distribution of measurement quality index data using a plurality of analysis condition data to be provided to an analysis device and a plurality of measurement data obtained in the analysis device based on the plurality of analysis condition data, a calculator that calculates the measurement quality index data from the measurement data obtained from the analysis device, and a comparison outputter that compares and outputs for display the measurement quality index data estimated by the estimator and the measurement quality index data calculated by the calculator.

9 Claims, 10 Drawing Sheets

(56) References Cited

U.S. PATENT DOCUMENTS

| | | | |
|---|---|---|---|
| 2014/0156612 A1* | 6/2014 | Bondarenko | H01J 49/0036 |
| | | | 707/693 |
| 2014/0236497 A1* | 8/2014 | Escher | G01N 30/8675 |
| | | | 702/30 |
| 2015/0253293 A1 | 9/2015 | Ohashi | |
| 2016/0180555 A1 | 6/2016 | Matsuo | |
| 2017/0322190 A1 | 11/2017 | Nyholm et al. | |
| 2019/0086374 A1 | 3/2019 | Ito et al. | |
| 2019/0092835 A1 | 3/2019 | Leister et al. | |
| 2019/0369069 A1* | 12/2019 | Ota | G06F 3/14 |
| 2020/0064193 A1* | 2/2020 | Chono | H04L 1/16 |
| 2020/0110064 A1 | 4/2020 | Sugimoto | |
| 2021/0009964 A1 | 1/2021 | Khatwani et al. | |
| 2021/0048414 A1 | 2/2021 | Gardinier et al. | |
| 2021/0405002 A1 | 12/2021 | Noda | |

FOREIGN PATENT DOCUMENTS

| | | |
|---|---|---|
| EP | 2270491 A | 1/2011 |
| JP | 02-300660 A | 12/1990 |
| JP | 05-322869 A | 12/1993 |
| JP | H06-324029 A | 11/1994 |
| JP | H07-151743 A | 6/1995 |
| JP | H09-318613 A | 12/1997 |
| JP | 2004-053283 A | 2/2004 |
| JP | 2012-163476 A | 8/2012 |
| JP | 2014-098672 A | 5/2014 |
| JP | 2015-166726 A | 9/2015 |
| JP | 2017-534060 A | 11/2017 |
| WO | 2020/020152 A1 | 1/2020 |

OTHER PUBLICATIONS

Office Action for commonly owned-copending U.S. Appl. No. 17/230,745 dated Oct. 10, 2022.

Office Action in the counterpart Chinese patent application 202110380504.0, and English machine translation thereof, dated Nov. 24, 2022.

Publication "Study to Determine Sudan Red Component in Hot Pepper Products by High Performance Liquid Chromatography" by Kanan Chemicals; vol. 27, No. 11; pp. 33-37, and English machine translation thereof, dated Nov. 30, 2010.

Office Action for commonly owned-copending U.S. Appl. No. 17/230,745 dated May 3, 2023.

Office Action for related U.S. Appl. No. 17/230,723 dated Mar. 10, 2023.

Office Action dated Jun. 16, 2023 for corresponding Chinese Application No. 202110380504.0 (English machine translation).

Notice of Reasons for Refusal dated Jul. 4, 2023 in the corresponding Japanese Patent Application (2020-077306) (English machine translation).

Office Action in corresponding Chinese Patent Application No. 202110493186.9 dated Jul. 27, 2023, with English machine translation.

Office Action in corresponding Chinese Patent Application No. 202110380504.0 dated Sep. 7, 2023, with English machine translation.

Office Action in corresponding Chinese Patent Application No. 202110439368.8 dated Sep. 1, 2023, with English machine translation.

Notice of Reasons for Refusal in related JP Patent Application No. 2020-084060 dated Jul. 11, 2023, with English machine translation.

* cited by examiner

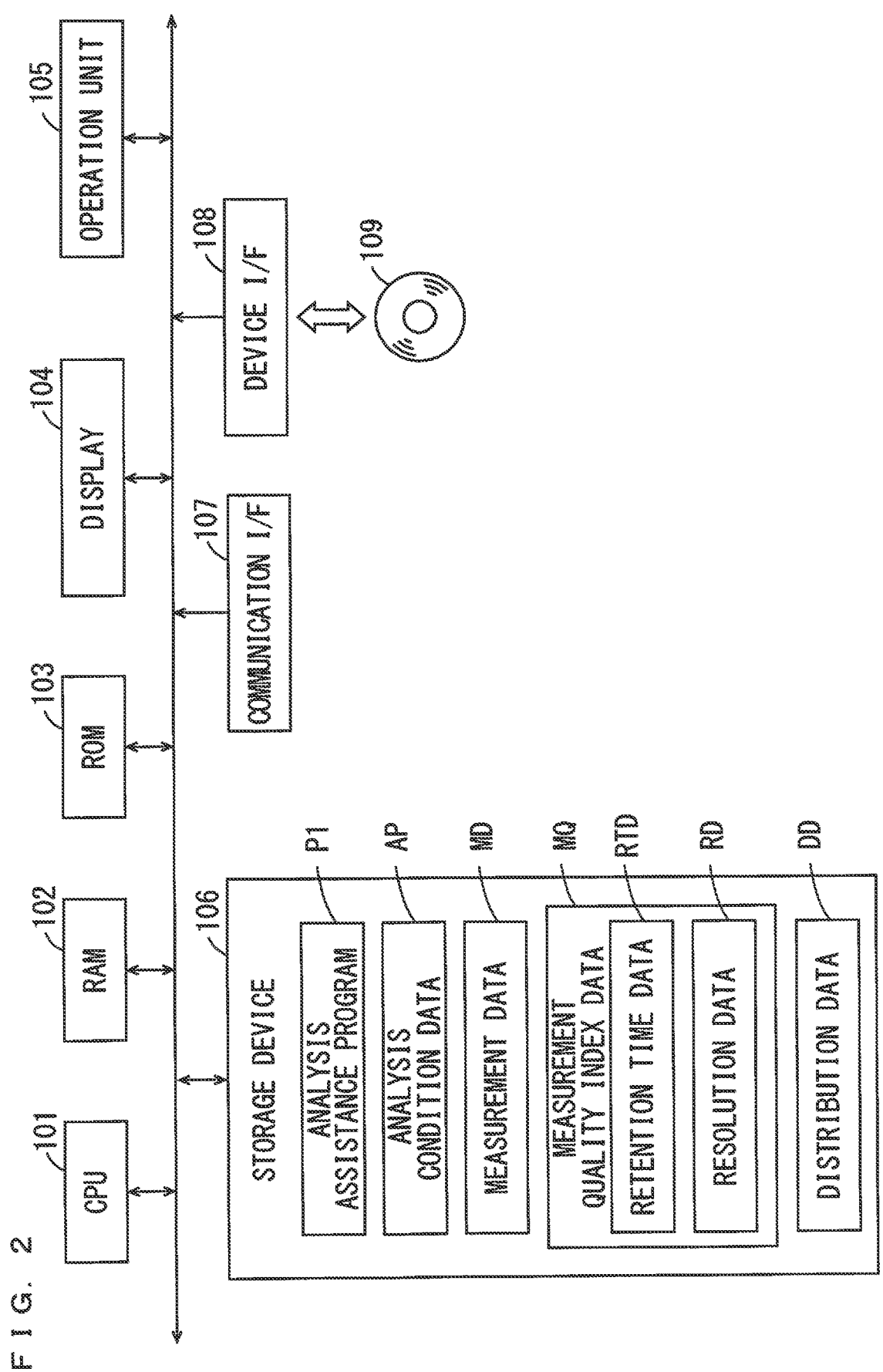
F I G. 2

ANALYSIS ASSISTANCE DEVICE, ANALYSIS ASSISTANCE METHOD AND NON-TRANSITORY COMPUTER READABLE MEDIUM STORING ANALYSIS ASSISTANCE PROGRAM

BACKGROUND

Technical Field

The present invention relates to an analysis assistance device, an analysis assistance method, and a non-transitory computer readable medium storing an analysis assistance program.

Description of Related Art

An analysis device that analyzes components of a sample is provided. An analysis result of the sample is varied depending on analysis conditions set in the analysis device and, therefore, method scouting for searching for an optimal analysis condition is performed.

JP 2015-166726 A discloses a chromatograph data processor. The data processor of JP 2015-166726 A assists changes of analysis conditions by presenting unexamined analysis conditions to a user.

SUMMARY

With the data processor disclosed in JP 2015-166726 A, unexamined analysis conditions can be easily acquired. Furthermore, if various information for optimizing analysis conditions can be provided, it is useful for a user who uses an analysis device.

An object of the present invention is to provide a user with information useful for optimizing an analysis condition in an analysis device.

An analysis assistance device according to one aspect of the present invention includes an estimator that estimates distribution of measurement quality index data using a plurality of analysis condition data to be provided to an analysis device and a plurality of measurement data obtained in the analysis device based on the plurality of analysis condition data, and a calculator that calculates measurement quality index data from the measurement data obtained from the analysis device, and a comparison outputter that compares and outputs for display the measurement quality index data estimated by the estimator and the measurement quality index data calculated by the calculator.

Other features, elements, characteristics, and advantages of the present disclosure will become more apparent from the following description of preferred embodiments of the present disclosure with reference to the attached drawings.

BRIEF DESCRIPTION OF THE DRAWING

FIG. 2 is a configuration diagram of a computer according to the present embodiment;

DETAILED DESCRIPTION

Configurations of an analysis assistance device, an analysis assistance method, and an analysis assistance program according to an embodiment of the present invention will be described below with reference to the attached drawing.

(1) Overall Configuration of Analysis System

Figure 1:
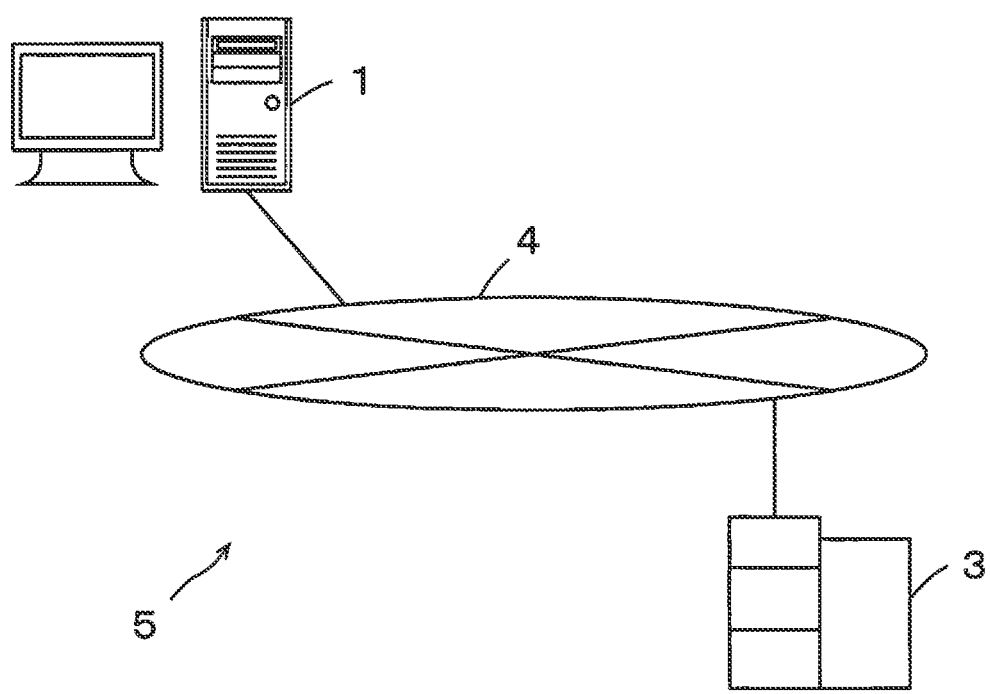
FIG. 1 is an overall view of an analysis system according to the present embodiment.

FIG. 1 is an overall diagram of an analysis system 5 according to the embodiment of the present invention. The analysis system 5 includes a computer 1 and a liquid chromatograph 3. The computer 1 and the liquid chromatograph 3 are connected to each other via a network 4. The network 4 is, for example, a LAN (Local Area Network).

The computer 1 includes a function of setting analysis conditions in the liquid chromatograph 3, a function of acquiring measurement results in the liquid chromatograph 3 and analyzing the acquired measurement results, etc. A program for controlling the liquid chromatograph 3 is installed in the computer 1.

The liquid chromatograph 3 includes a pump unit, an autosampler unit, a column oven unit, a detector unit, etc. The liquid chromatograph 3 includes also a system controller. The system controller controls the liquid chromatograph 3 in accordance with a control instruction received via the network 4 from the computer 1. The system controller transmits data of the measurement results of the liquid chromatograph 3 to the computer 1 via the network 4.

(2) Configuration of Computer (Analysis Assistance Device)

FIG. 2 is a configuration diagram of the computer 1. A personal computer is utilized as the computer 1 in the present embodiment. The computer 1 includes a CPU (Central Processing Unit) 101, a RAM (Random Access Memory) 102, a ROM (Read Only Memory) 103, a display 104, an operation unit 105, a storage device 106, a communication interface 107, and a device interface 108.

The CPU 101 performs control of the computer 1. The RAM 102 is used as a work area when the CPU 101 executes a program. The ROM 103 stores a control program, etc. The display 104 is, for example, a liquid crystal display. The operation unit 105 is a device that accepts a user's operation and includes a keyboard, a mouse, etc. The display 104 may be constituted by a touch panel display and may include a function as the operation unit 105. The storage device 106 is a device that stores various programs and data. The storage device 106 is, for example, a hard disk. The communication interface 107 is an interface that communicates with another computer and another device. The communication interface 107 is connected to the network 4. The device interface 108 is an interface that accesses various external devices. The CPU 101 can access a storage medium 109 through the external devices connected to the device interface 108.

The storage device 106 stores an analysis assistance program P1, analysis condition data AP, measurement data MD, measurement quality index data MQ, and distribution data DD. The analysis assistance program P1 is a program for controlling the liquid chromatograph 3. The analysis assistance program P1 includes a function of setting an analysis condition for the liquid chromatograph 3, a function of acquiring a measurement result from the liquid chromatograph 3 and analyzing the measurement result, etc. The analysis condition data AP is data that describes the analysis condition to be set in the liquid chromatograph 3 and includes a plurality of analysis parameters. The measurement data MD is data of the measurement result acquired from the liquid chromatograph 3. The measurement quality index data MQ is data for evaluating quality of the measurement result acquired from the liquid chromatograph 3. The measurement quality index data MQ includes retention time data RTD and resolution data RD. The distribution data DD is data indicating distribution of measurement quality index data MQ estimated based on analysis condition data AP actually set in the liquid chromatograph 3 and measurement data MD actually measured in the liquid chromatograph 3. The distribution data DD indicates a response surface of the measurement quality index data MQ. The distribution and the response surface of the measurement quality index data MQ will be described in detail later.

Figure 3:
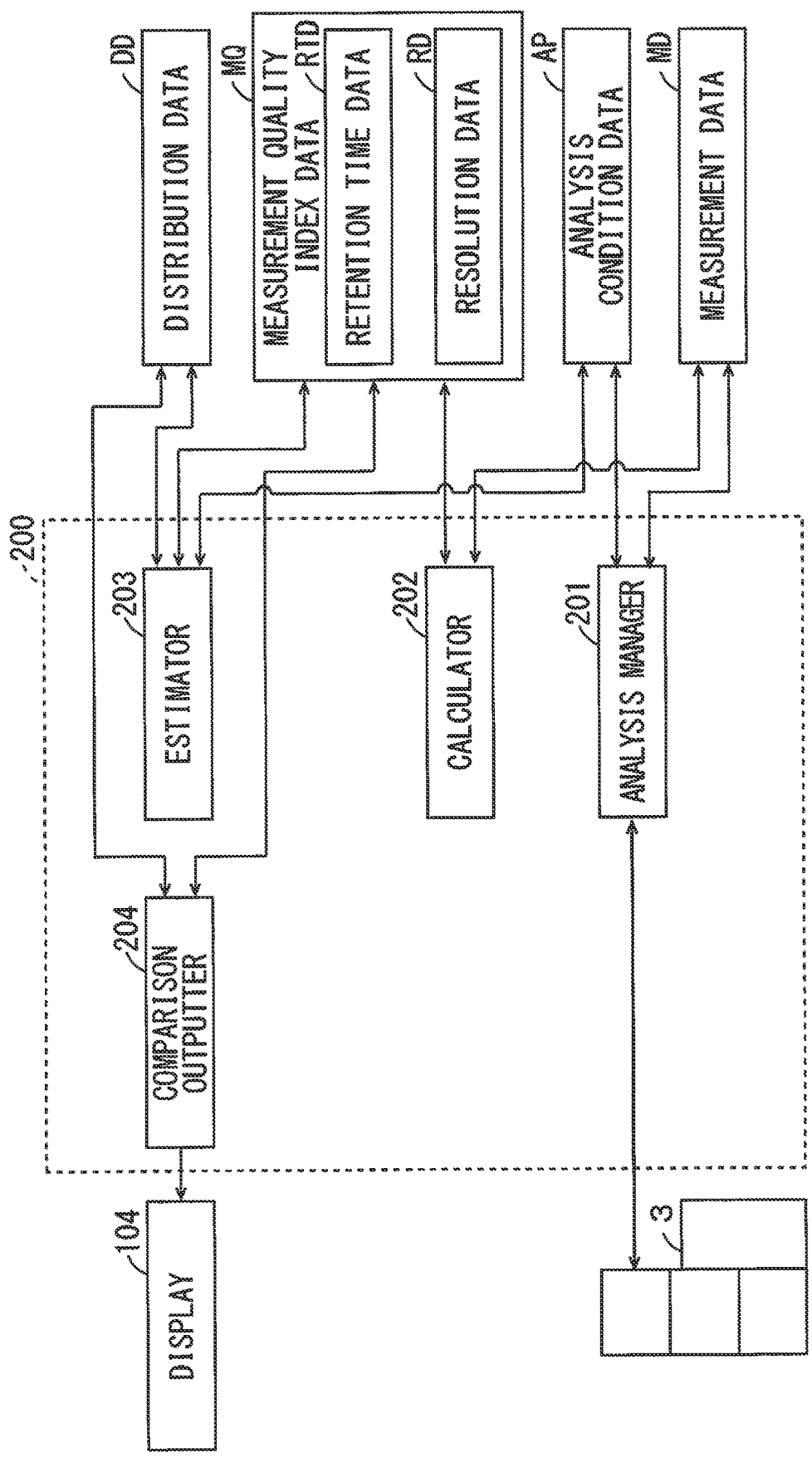
FIG. 3 is a functional block diagram of the computer according to the present embodiment.

FIG. 3 is a functional block diagram of the computer 1. A controller 200 is a functional unit that is implemented by the CPU 101 using the RAM 102 as a work area to execute the analysis assistance program P1. The controller 200 includes an analysis manager 201, a calculator 202, an estimator 203, and a comparison outputter 204.

The analysis manager 201 controls the liquid chromatograph 3. The analysis manager 201 instructs the liquid chromatograph 3 to perform analysis processing in response to the user's instruction to set analysis condition data AP and start the analysis processing. The analysis manager 201 also acquires measurement data MD from the liquid chromatograph 3.

The calculator 202 calculates measurement quality index data MQ based on measurement data MD indicating a measurement result in the liquid chromatograph 3. The calculator 202 calculates retention time data RTD and resolution data RD as the measurement quality index data MQ.

The estimator 203 estimates distribution data DD indicating distribution of measurement quality index data MQ based on analysis condition data AP used for actual measurement and measurement quality index data MQ actually calculated based on that analysis condition data AP. That is, the distribution data DD includes an estimated value of the measurement quality index data MQ for analysis condition data AP that is not actually used for measurement. The estimator 203 performs a regression analysis for estimating the distribution data DD.

The comparison outputter 204 performs comparison and output of a measurement quality index on the display 104 using the measurement quality index data MQ actually calculated based on the analysis condition data AP, and the estimated measurement quality index data MQ.

(3) Measurement Quality Index and Design Space

Figure 4:
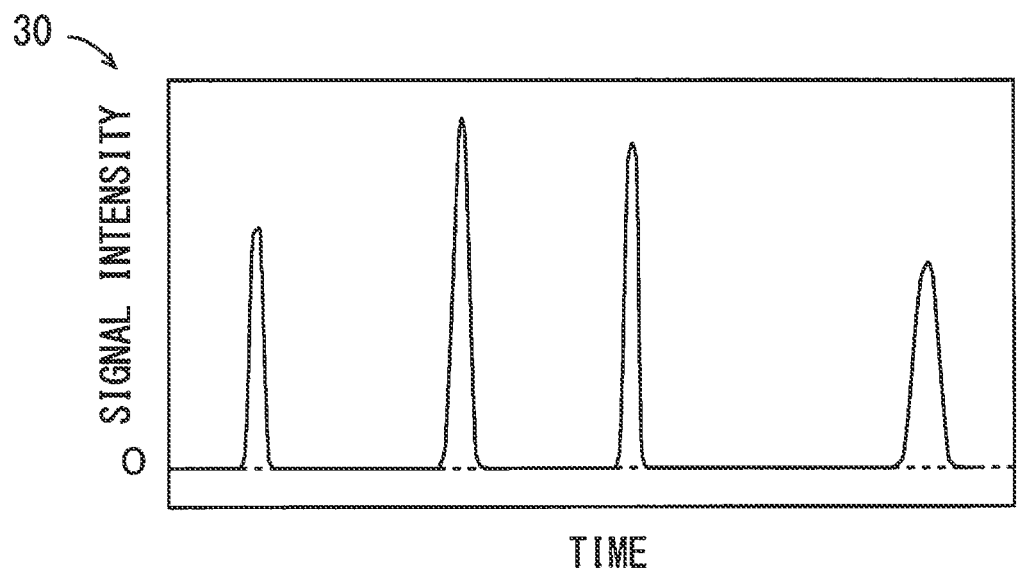
FIG. 4 is a diagram showing a chromatogram obtained in a liquid chromatograph.

A measurement quality index and a design space will be described below with reference to FIGS. 4 to 6. FIG. 4 is a diagram showing a chromatogram 30 obtained in the liquid chromatograph 3. In a separation column included in the liquid chromatograph 3, components contained in a sample are separated. The separated components are detected by a detector included in the liquid chromatograph 3. The detector detects an absorption spectrum, a refractive index, light scattering or the like of each component separated in the separation column. The chromatogram 30 shown in FIG. 4 indicates signal intensity of the absorption spectrum or the like of each component detected by the detector of the liquid chromatograph 3.

Figure 5:
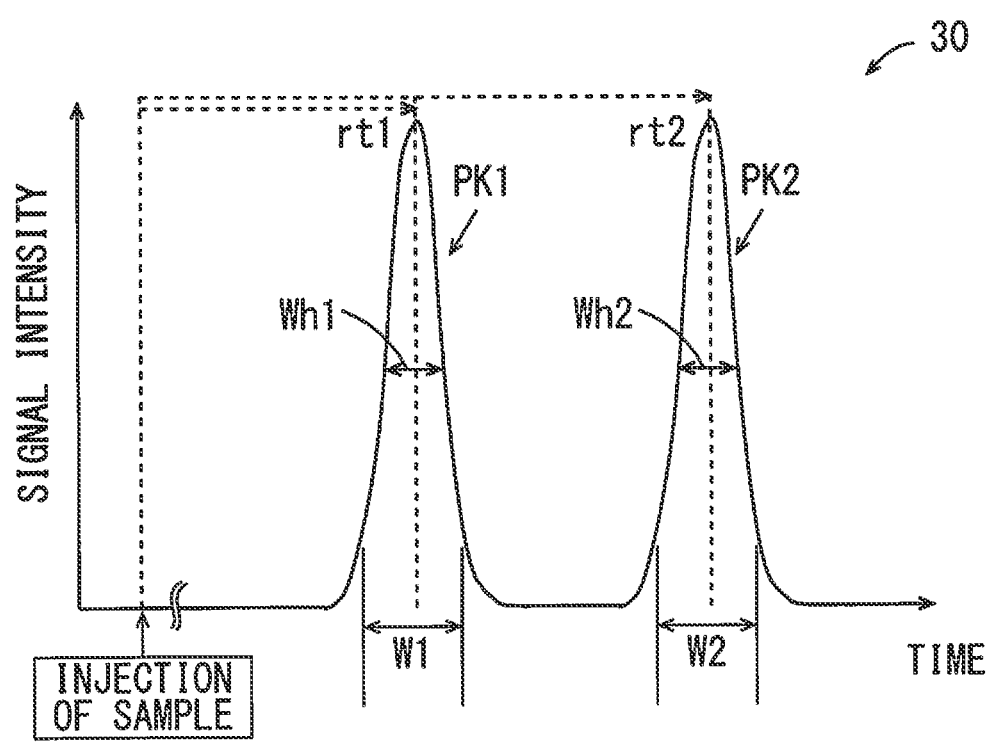
FIG. 5 is a diagram showing peaks in the chromatogram.

FIG. 5 is a diagram showing two peaks PK1, PK2 in the chromatogram 30.

Retention times of the peaks PK1, PK2 are $rt1$, $rt2$, respectively. Peak widths of the peaks PK1, PK2 are W1, W2, respectively. Half widths (full widths at half maximum) of the peaks PK1, PK2 are Wh1, Wh2, respectively. Resolution R of the peaks PK1, PK2 is expressed by the flowing equation (1) or (2), for example.

$$R = 2 \times (rt2 - rt1)/(W1 + W2) \quad (1)$$

$$R = 1.18 \times \{(rt2 - rt1)/(Wh1 + Wh2)\} \quad (2)$$

The above equations mean that adjacent peaks are separated at a farther distance from each other as the value of the resolution R becomes larger. When the resolution R is not less than 1.5 or not less than 2.0, the adjacent peaks are determined to be completely separated.

When the resolution R exceeds a predetermined threshold value (e.g. 2.0), it is considered that a measurement result in the liquid chromatograph 3 is valid. That is, the resolution R is one of measurement quality indexes in the liquid chromatograph 3. A plurality of peaks corresponding to a plurality of components appear in the chromatogram 30. A minimum resolution R among a plurality of resolutions R calculated from these plurality of peaks can be defined as a measurement quality index. Alternatively, the retention time $rt1$, $rt2$ is also one of the measurement quality indexes in the liquid chromatograph 3.

A plurality of measurement data MD can be obtained by actually providing the liquid chromatograph 3 with a plurality of analysis condition data AP. Resolution data RD corresponding to each analysis condition data AP can be calculated from the actually measured measurement data MD. Then, distribution of the resolution data RD can be obtained by a regression analysis from the plurality of analysis condition data AP and the plurality of resolution data RD obtained from the plurality of analysis condition data AP. That is, distribution of measurement quality index data MQ can be obtained from the plurality of analysis condition data AP and the plurality of resolution data RD.

More specifically, a regression equation between the actually used plurality of analysis condition data AP and the plurality of resolution data RD calculated from the actually measured measurement data MD is acquired. Then, by applying the regression equation to other analysis condition data AP that are not actually used, resolution data RD corresponding to these other analysis condition data AP are estimated. Thus, distribution of the resolution data RD as the measurement quality index is obtained. That is, the regression equation indicates the distribution of the resolution data RD as the measurement quality index. Alternatively, distribution of the retention time data RTD may be estimated by the regression analysis, and the resolution data RD may be calculated from the estimated retention time data RTD. Bayes estimation can be used in the regression analysis.

Figure 6:
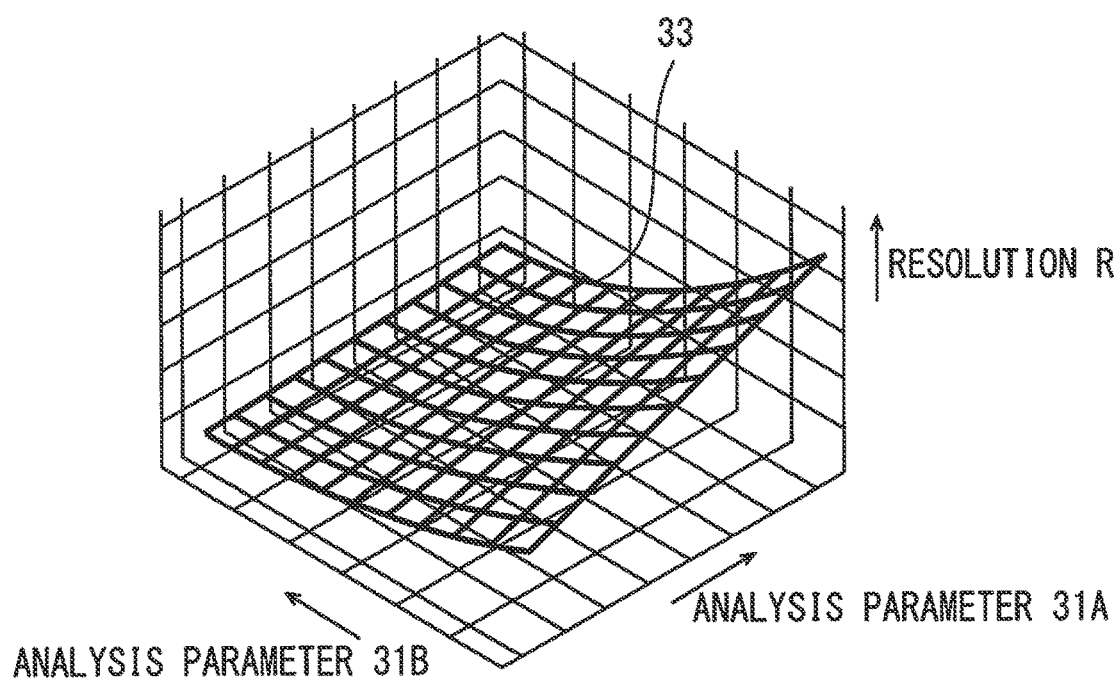
FIG. 6 is a diagram showing a response surface showing distribution of resolution.

FIG. 6 is a diagram showing one example of a response surface 33 which is the distribution of the resolution data RD. That is, FIG. 6 is a diagram showing the distribution of the resolution data RD as the measurement quality index. FIG. 6 depicts a response surface 33 indicating a change in resolution R relative to two types of analysis parameters 31A, 31B as the analysis condition. That is, if a combination of the analysis parameters 31A, 31B as the analysis condition is determined, resolution R corresponding to the determined combination is evaluated from the response surface 33.

Figure 7:
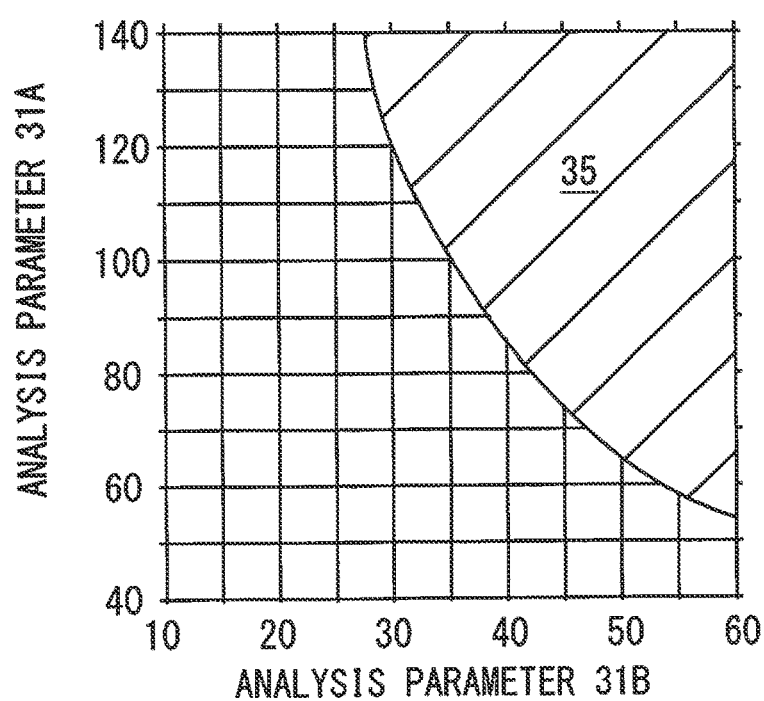
FIG. 7 is a diagram showing a design space relative to the distribution of resolution.

FIG. 7 is a diagram showing a design space relative to distribution of resolution R. In the response surface 33 shown in FIG. 6, a design space 35 being an allowable range of the resolution R is acquired by setting a threshold value of the resolution R as the measurement quality index. FIG. 7 depicts a region where the resolution R is not lower than a threshold value (e.g., 2.0) as the design space 35 in the response surface 33 shown in FIG. 6. In FIG. 7, a hatched region is the design space 35. In the region of the design space 35, even if the analysis parameters 31A, 31B are changed, it is shown that the resolution R as the measurement quality index falls within the allowable range.

(4) Analysis Assistance Method

Figure 8:
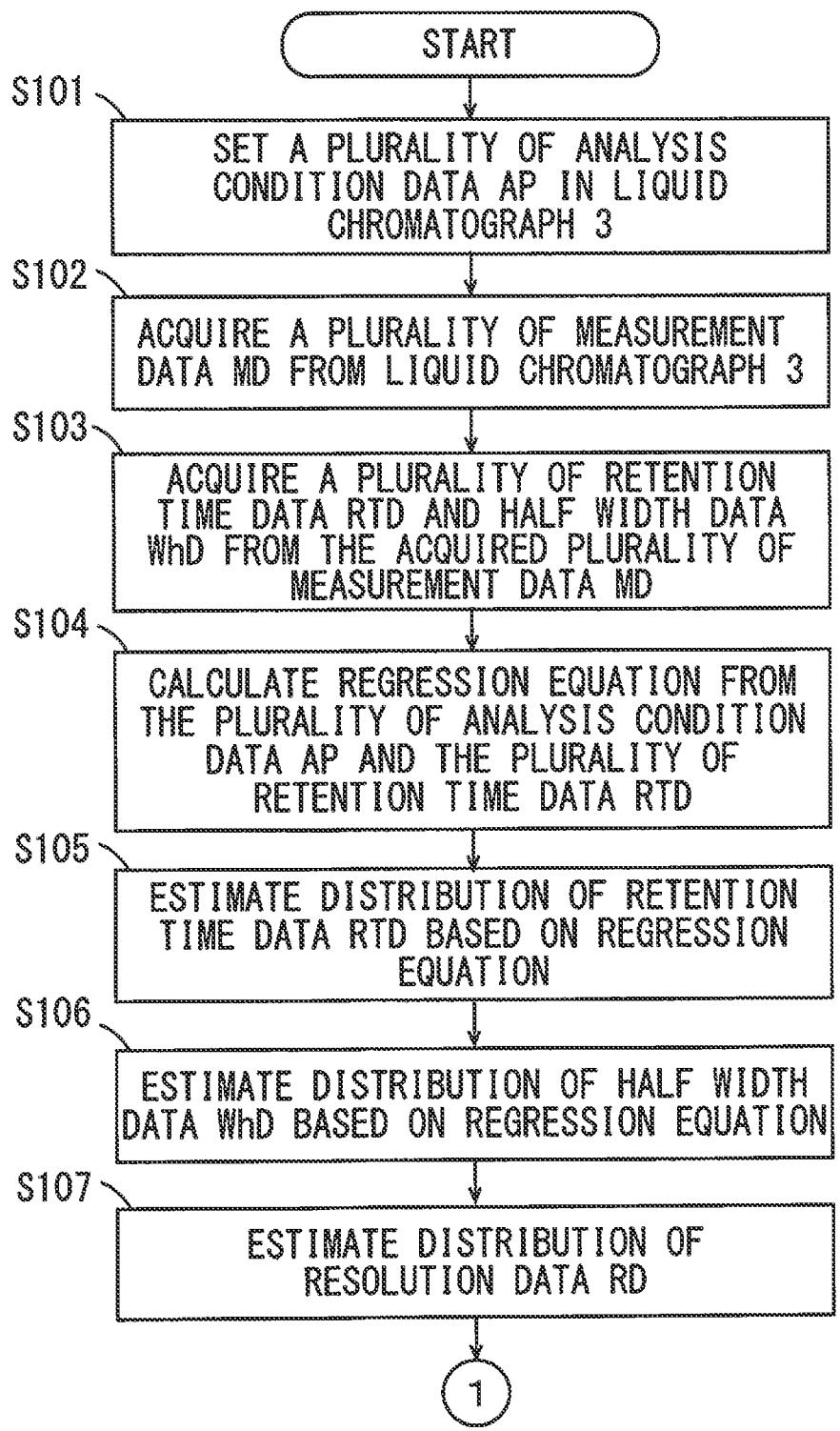
FIG. 8 is a flowchart showing an analysis assistance method according to the present embodiment.
Figure 9:
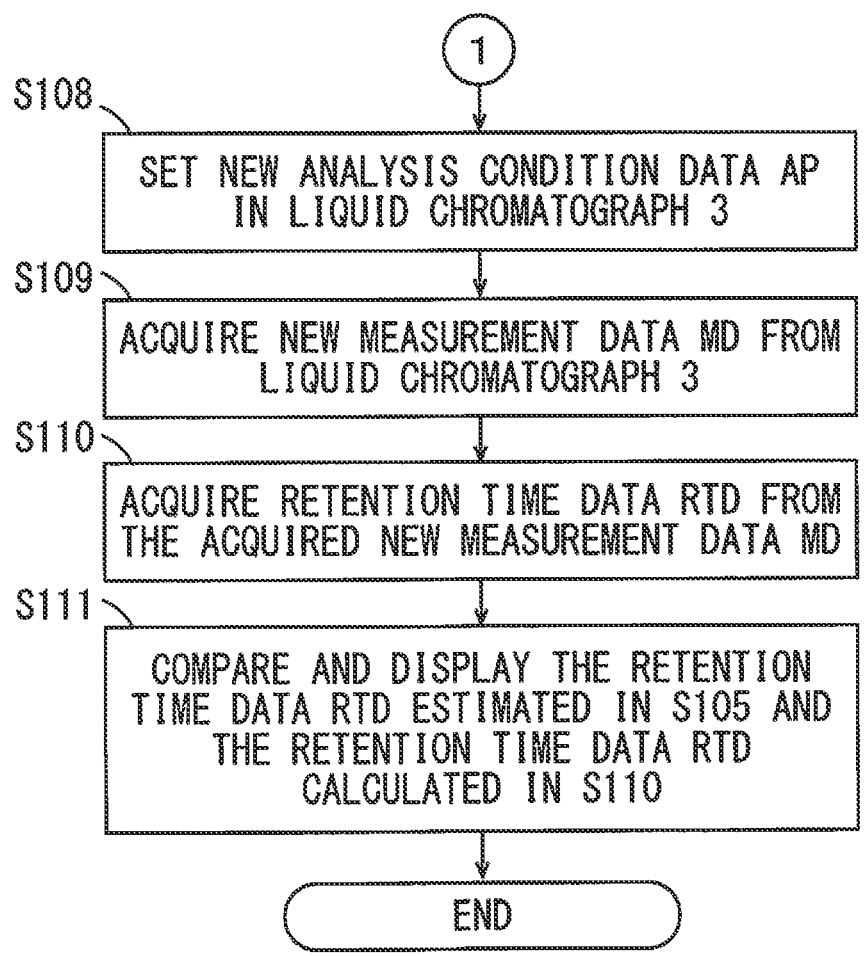
FIG. 9 is a flowchart showing the analysis assistance method according to the present embodiment.

An analysis assistance method executed in the computer 1 (analysis assistance device) according to the present embodiment will be described below. FIGS. 8 and 9 are flowcharts showing the analysis assistance method according to the present embodiment. Before processing shown in FIGS. 8 and 9 is started, a user operates the operation unit 105 in advance to set a plurality of analysis conditions. More specifically, the user sets combinations of set values of analysis parameters such as a solvent concentration, a solvent mixing ratio, a gradient initial value, a gradient condition, a column temperature as the analysis conditions. The user sets a plurality of sets of combinations of these analysis parameters. The user sets, as the analysis conditions, for example, combinations of the analysis parameters in which the solvent concentration is gradually changed, or combinations of the analysis parameters in which the column temperature is gradually changed. In response to such a setting operation by the user, the analysis manager 201 stores a plurality of analysis condition data AP in the storage device 106.

Then, in step S101 shown in FIG. 8, the analysis manager 201 sets the plurality of analysis condition data AP in the liquid chromatograph 3. More specifically, the analysis manager 201 sets the plurality of analysis condition data AP for a system controller of the liquid chromatograph 3. In response to this, analysis processing is executed plural times on a same sample based on the set plurality of analysis condition data AP. A plurality of measurement data MD corresponding to the plurality of analysis condition data AP are acquired in the liquid chromatograph 3. That is, a plurality of chromatograms corresponding to the plurality of analysis condition data AP are acquired in the liquid chromatograph 3.

Next, in step S102, the analysis manager 201 acquires the plurality of measurement data MD from the liquid chromatograph 3. The analysis manager 201 stores the acquired plurality of measurement data MD in the storage device 106.

Then, in step S103, the calculator 202 acquires the plurality of measurement data MD stored in the storage device 106 in step S102, and acquires a plurality of retention time data RTD and half width data WhD from the acquired plurality of measurement data MD. Since the measurement data MD are chromatograms, each measurement data MD includes a plurality of peaks. Thus, the plurality of retention time data RTD and the plurality of half width data WhD corresponding to the plurality of peaks are acquired from each measurement data MD.

Then, in step S104, the estimator 203 performs a regression analysis based on the plurality of analysis condition data AP and the plurality of retention time data RTD. Thus, the estimator 203 calculates a regression equation between the analysis condition and the retention time. Subsequently, in step S105, the estimator 203 estimates distribution of the retention time data RTD based on the regression equation. In the present embodiment, Bayes estimation is used when the regression analysis is performed. As another method, a least-square method can also be used as the regression analysis.

Moreover, the estimator 203 performs the regression analysis based on the measured plurality of retention time data RTD and the measured plurality of half width data WhD. Thus, the estimator 203 calculates a regression equation between the retention time and the half width. Subsequently, in step S106, the estimator 203 estimates the half width data WhD based on the regression equation. In the present embodiment, Bayes estimation is used when the regression analysis is performed. As another method, the least-square method can also be used as the regression analysis.

In the aforementioned steps S101 to S106, the distribution of the retention time data RTD and the half width data WhD is estimated. Subsequently, in step S107, distribution of the resolution data RD is estimated based on the estimated retention time data RTD and the estimated half width data WhD. More specifically, the resolution data RD is calculated based on the retention time data RTD and the half width data WhD by utilizing the aforementioned equation (2). Note that while the distribution of the half width data WhD is estimated, and the resolution data RD is calculated by utilizing the equation (2) in the present embodiment, distribution of peak widths may be estimated, and the resolution data RD may be calculated by utilizing the equation (1).

Since the aforementioned steps S101 to S107 using the analysis assistance program P1 are executed by the computer 1, retention time data RTD and resolution data RD are estimated also as for analysis conditions other than the actually executed analysis conditions. Thus, distribution using the resolution data RD as the measurement quality index can be created. In addition, a design space using the resolution data RD as the measurement quality index can be created by setting a predetermined threshold value.

Subsequently, the user operates the operation unit 105 to set new analysis conditions. In response to this, the analysis manager 201 stores new analysis condition data AP in the storage device 106. The analysis manager 201 sets the new analysis condition data AP in the liquid chromatograph 3 in step S108 shown in FIG. 9. In response to this, analysis processing is executed based on the set new analysis condition data AP in the liquid chromatograph 3. New measurement data MD corresponding to the new analysis condition data AP is acquired in the liquid chromatograph 3.

Then, in step S109, the analysis manager 201 acquires the new measurement data MD from the liquid chromatograph 3. The analysis manager 201 stores the acquired new measurement data MD in the storage device 106.

Next, in step S110, the calculator 202 acquires the new measurement data MD stored in the storage device 106 in step S109, and acquires retention time data RTD from the acquired new measurement data MD.

Figure 10:
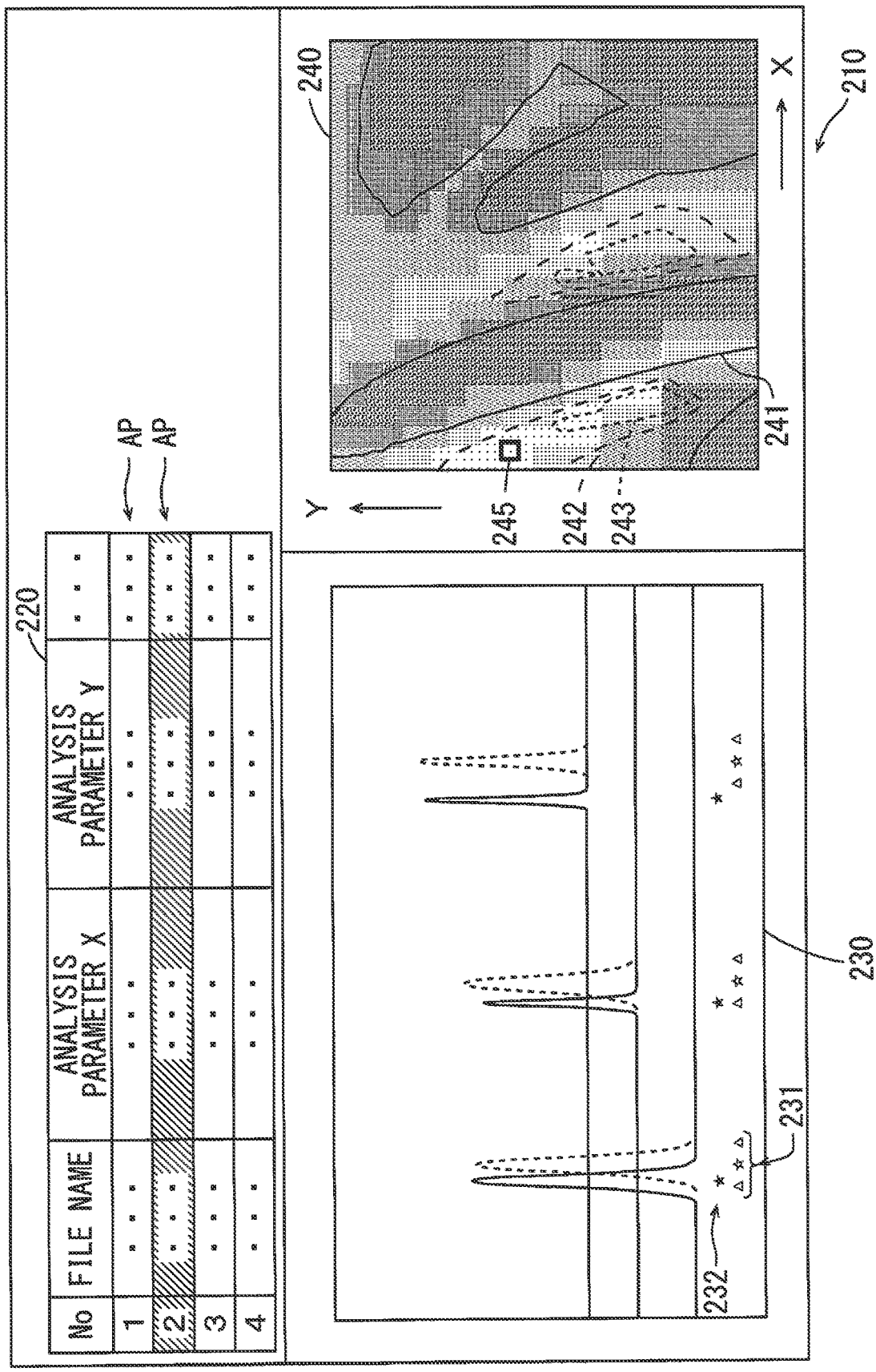
FIG. 10 is a diagram showing an analysis assistance screen displayed in a display.

Then, in step S111, the comparison outputter 204 compares and outputs the retention time data RTD estimated in step S105 and the retention time data RTD acquired in step S110 to the display 104. FIG. 10 is a diagram showing an analysis assistance screen 210 that is displayed on the display 104 by the comparison outputter 204. The analysis assistance screen 210 includes a method list display 220, a chromatogram display 230, and a measurement quality index display 240.

The method list display 220 displays a list of a plurality of analysis condition data AP. The analysis condition data AP in a row is constituted by a plurality of analysis parameters X, Y . . . .

The chromatogram display 230 displays a chromatogram based on measurement data MD by the solid line. The chromatogram displayed in the chromatogram display 230 by the solid line is a chromatogram corresponding to any one of the plurality of analysis condition data AP displayed in the method list display 220. In an example shown in FIG. 10, analysis condition data AP of No. 2 is highlighted in the method list display 220, and a chromatogram corresponding to the analysis condition data AP of No. 2 is displayed in the chromatogram display 230. The chromatogram denoted by the broken line among the chromatograms displayed in the chromatogram display 230 is a chromatogram estimated by the estimator 203. The chromatogram denoted by the solid line is a chromatogram based on measurement data MD calculated by the calculator 202 (actually measured measurement data MD).

The measurement quality index display 240 displays distribution of resolution data RD as the measurement quality index. The abscissa of the distribution represents the analysis parameter X, and the ordinate represents the analysis parameter Y. The distribution of the resolution data RD indicates a relationship between the two analysis parameters X, Y and the resolution data RD. The magnitude of the resolution data RD is represented by light and shade. A darker shade portion represents a region of smaller resolution data RD, while a lighter shade portion represents a region of larger resolution data RD. That is, the lighter shade region indicates a higher measurement quality index.

Also, a solid line 241 in FIG. 10 represents an effective region where the resolution data RD is not less than a threshold value of 2.0 at 50 percentile. A broken line 242 in FIG. 10 represents an effective region where the resolution data RD is not less than a threshold value of 2.0 at 80 percentile. A broken line 243 in FIG. 10 represents an effective region where the resolution data RD is not less than a threshold value of 2.0 at 90 percentile. In the present embodiment, the resolution data RD displayed in the measurement quality index display 240 is calculated by Bayes estimation and therefore has probability distribution. Thus, a design space is depicted where the resolution data RD is not less than a threshold value of 2.0 for each percentile. Color coding of lighter and darker shades of the measurement quality index display 240 is depicted based on the resolution data RD of 50 percentile.

Also, an analysis condition pointer 245 is indicated in the measurement quality index display 240. This represents a point of currently selected analysis condition data AP. A chromatogram corresponding to the analysis condition data AP designated by the analysis condition pointer 245 is displayed in the chromatogram display 230. That is, the analysis condition data AP highlighted in the method list display 220 coincides with the analysis condition data AP designated by the analysis condition pointer 245 in the measurement quality index display 240. A position selected in the method list display 220 and a position designated by the analysis condition pointer 245 are in conjunction with each other, and the states of the both positions are changed by performing either the selecting operation or the designating operation.

Also, the chromatogram display 230 displays peak position marks 231, 232. The peak position marks 231 represent peak positions of the estimated chromatogram denoted by the broken line. That is, the peak position marks 231 indicate the estimated retention time data RTD. The peak position marks 232 represent peak positions of the calculated chromatogram denoted by the solid line. That is, the peak position marks 232 indicate the retention time data RTD based on the actually measured measurement data MD. Among the peak position marks 231, a hollow asterisk represents an estimated value of 50 percentile, and a hollow triangle represents an estimated value of 90 percentile. In the present embodiment, Bayes estimation is used for estimation of retention time data RTD in the estimator 203. Thus, the estimated retention time data RTD also has probability distribution.

In this way, the comparison outputter 204 compares and outputs the retention time data RTD estimated by the estimator 203 and the retention time data RTD calculated by the calculator 202 (actually measured retention time data RTD) to the display 104. That is, the comparison outputter 204 compares and outputs the measurement quality index estimated by the estimator 203 and the measurement quality index calculated by the calculator 202. This makes it possible for the user to confirm accuracy of the estimation by the estimator 203. The computer 1 of the present embodiment can provide the user with information useful for optimization of analysis conditions.

Furthermore, the comparison outputter 204 displays in the chromatogram display 230 the probability distribution of the retention time data RTD being the measurement quality index estimated by the estimator 203. The comparison outputter 204 then compares and outputs the probability distribution of the retention time data RTD and the calculated retention time data RTD (actually measured retention time data RTD). In the example of FIG. 8, the comparison outputter 204 compares the estimated value of 50 percentile of the retention time data RTD and the estimated value of 90 percentile of the retention time data RTD with the actually measured retention time data RTD and displays the same. This makes it possible for the user to compare the actual measured value with the probability distribution of the estimated value by the estimator 203.

Furthermore, the comparison outputter 204 outputs in the measurement quality index display 240 the distribution of the resolution data RD being the measurement quality index estimated by the estimator 203. Then, in response to a designation operation for an arbitrary point in a distribution image displayed in the measurement quality index display 240, the comparison outputter 204 acquires analysis condition data AP corresponding to the designated point. In addition, the comparison outputter 204 compares and outputs the estimated retention time data RTD corresponding to the acquired analysis condition data AP and the retention time data RTD calculated by the calculator 202, corresponding to the acquired analysis condition data AP. This makes it possible for the user to confirm a relationship between the distribution in the measurement quality index display 240 and the estimated retention time data RTD as well as the calculated retention time data RTD.

(5) Modification 1

Figure 11:
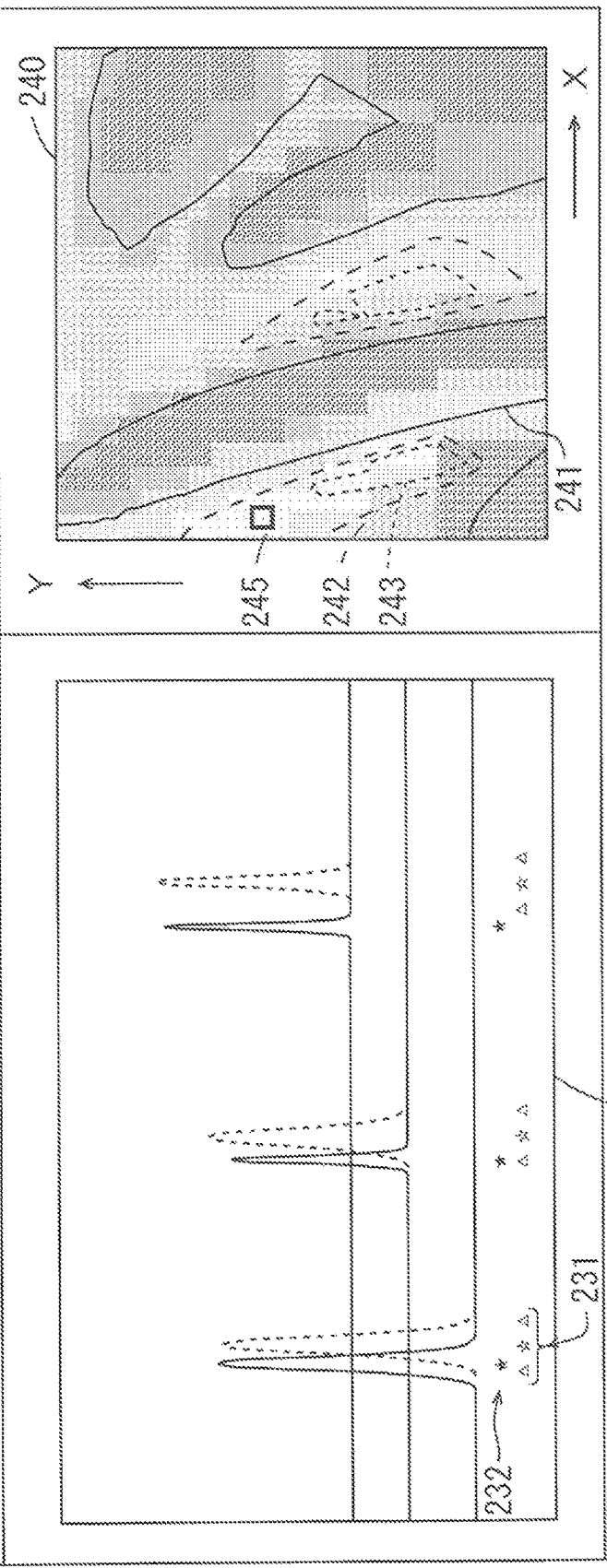
FIG. 11 is a diagram showing the analysis assistance screen according to a modification 1 displayed in the display.

FIG. 11 is a diagram showing an analysis assistance screen 210A according to a modification 1. The analysis assistance screen 210A includes a method list display 220A, a chromatogram display 230, and a measurement quality index display 240. The contents of the chromatogram display 230 and the measurement quality index display 240 are the same as those of the analysis assistance screen 210 shown in FIG. 10. In the method list display 220A of the modification 1, an estimated retention time section and an actually measured retention time section are added as display items in comparison with the analysis assistance screen 210 shown in FIG. 10.

In the estimated retention time section, retention time data RTD estimated in the estimator 203 is displayed for each analysis condition data AP. In the actually measured retention time section, retention time data RTD calculated in the calculator 202 (measured retention time data RTD) is displayed for each analysis condition data AP. These estimated retention time and actually measured retention time are displayed by the number of peaks. This makes it possible for the user to confirm the accuracy of estimation by the estimator using numerals. The computer 1 of the present embodiment can provide the user with information useful for optimization of analysis conditions.

(6) Modification 2

Figure 12:
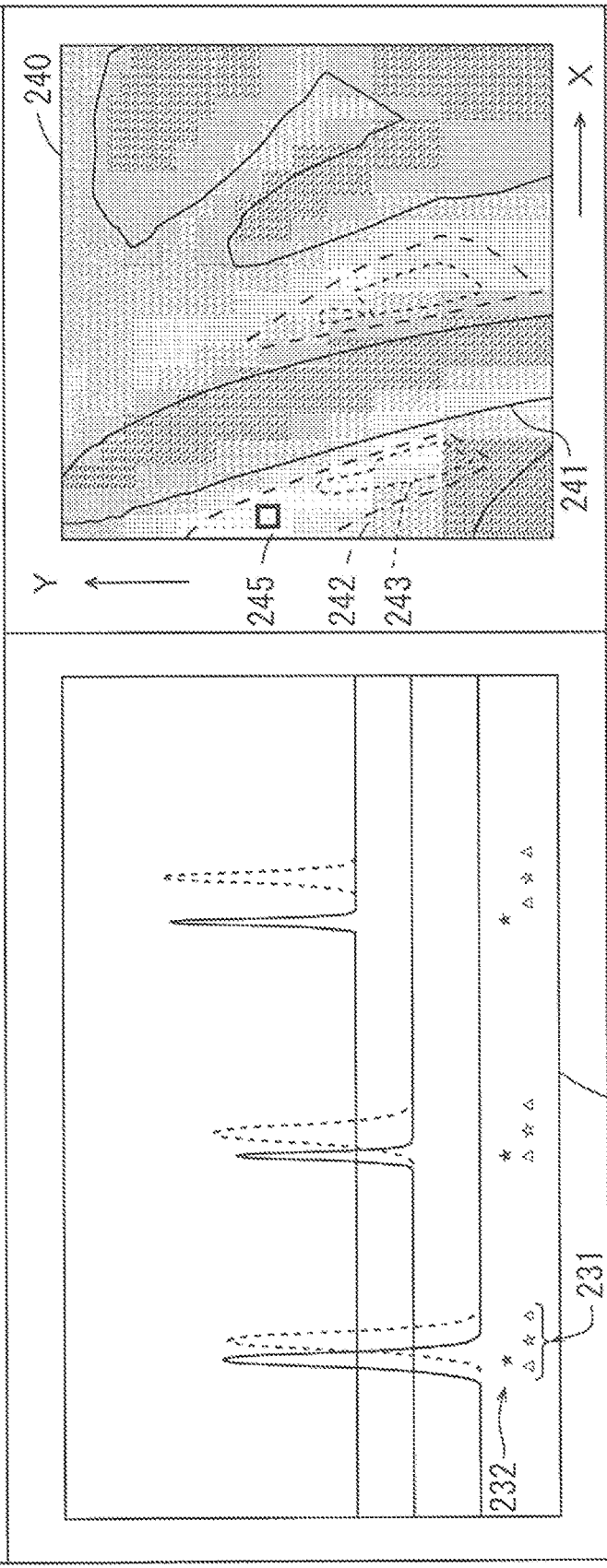
FIG. 12 is a diagram showing the analysis assistance screen according to a modification 2 displayed in the display.

FIG. 12 is a diagram showing an analysis assistance screen 210B according to a modification 2. The analysis assistance screen 210B includes a method list display 220B, a chromatogram display 230, and a measurement quality index display 240. The contents of the chromatogram display 230 and the measurement quality index display 240 are the same as those of the analysis assistance screen 210 shown in FIG. 10. In the method list display 220B of the modification 2, a category section is added as a display item in comparison with the analysis assistance screen 210 shown in FIG. 10.

In the category section, categories of differences between retention time data RTD estimated in the estimator 203 and retention time data RTD calculated in the calculator 202 are displayed. In an example shown in FIG. 12, ranks of Level_A, Level_B, Level_C are indicated as the categories. The categories represent that the accuracy of an estimation result by the estimator 203 is indicated in the descending order of Level_A>Level_B>Level_C. That is, the categories are ranked as Level_A, Level_B, Level_C in the order in which the difference between the estimated retention time data RTD and the measured retention time data RTD becomes larger. This makes it possible for the user to confirm the accuracy of estimation by the estimator 203 using the categories. The computer 1 of the present embodiment can provide the user with information useful for optimization of analysis conditions.

(7) Correspondence between Constituent Elements in Claims and Parts in Preferred Embodiments In the following paragraphs, non-limiting examples of correspondences between various elements recited in the claims below and those described above with respect to various preferred embodiments of the present disclosure are explained. In the above-described embodiment, the chromatograph 3 is an example of an analysis device or a chromatograph. In the above-described embodiment, the computer 1 is an example of an analysis assistance device.

As each of various elements recited in the claims, various other elements having configurations or functions described in the claims can be also used.

(8) Other Embodiments

The chromatograph 3 has been explained as the analysis device of the present invention in the above-described embodiment. The present invention is also applicable to a gas chromatograph. Furthermore, the description has been made on the case where the computer 1 being the analysis assistance device of the present embodiment is connected to the liquid chromatograph 3 being the analysis device via the network 4 as an example in the above-described embodiment. As another embodiment, a configuration in which the computer 1 is incorporated in the analysis device may be applied.

In the above-described embodiment, the description has been made on the case where the analysis assistance program P1 is stored in the storage device 106 as an example. As another embodiment, the analysis assistance program P1 may be provided to be stored in the storage medium 109. The CPU 101 may access the storage medium 109 via the device interface 108 so that the analysis assistance program P1 stored in the storage medium 109 be stored in the storage device 106 or the ROM 103. Alternatively, the CPU 101 may access the storage medium 109 via the device interface 108 to execute the analysis assistance program P1 stored in the storage medium 109.

The specific configuration of the present invention is not limited to the above-described embodiments. Various variations and modifications are available without departing from the scope of the present invention.

(9) Aspects

The above-mentioned plurality of exemplary embodiments are understood as specific examples of the below-mentioned aspects by those skilled in the art.

(Item 1)

An analysis assistance device according to one aspect includes:

an estimator that estimates distribution of measurement quality index data using a plurality of analysis condition data to be provided to an analysis device and a plurality of measurement data obtained in the analysis device based on the plurality of analysis condition data;

a calculator that calculates the measurement quality index data from the measurement data obtained from the analysis device; and a comparison outputter that compares and outputs for display the measurement quality index data estimated by the estimator and the measurement quality index data calculated by the calculator.

A user can confirm accuracy of the estimation by the estimator. The analysis assistance device can provide the user with information useful for optimization of an analysis condition.

(Item 2)

In the analysis assistance device according to the item 1, the comparison outputter may compare and output probability distribution of the measurement quality index data estimated by the estimator and the measurement quality index data calculated by the calculator.

The user can compare an actual measured value and probability distribution of an estimated value by the estimator.

(Item 3)

In the analysis assistance device according to the item 1 or 2, the analysis device may include a chromatograph, the measurement quality index data may include retention time data of each component analyzed in the chromatograph, and the comparison outputter may compare and output the retention time data estimated by the estimator and the retention time data calculated by the calculator.

The user can confirm accuracy of the estimation of the retention time data by the estimator in analysis processing using the chromatograph. The analysis assistance device can provide the user with the information useful for optimization of the analysis condition.

(Item 4)

In the analysis assistance device according to the item 3, the comparison outputter may compare and output a peak image of a spectrum representing the retention time data estimated by the estimator and a peak image of a spectrum representing the retention time data calculated by the calculator.

Since the peak images of the spectra are compared and displayed, the user can visually confirm the accuracy of the estimation by the estimator.

(Item 5)

In the analysis assistance device according to the item 3, the comparison outputter may compare and output a numeral indicating the retention time data estimated by the estimator and a numeral indicating the retention time data calculated by the calculator.

The user can confirm the accuracy of the estimation by the estimator using magnitudes of the numerals. The analysis assistance device can provide the user with the information useful for optimization of the analysis condition.

(Item 6)

In the analysis assistance device according to the item 3, the comparison outputter may categorize and output a difference between the retention time data estimated by the estimator and the retention time data calculated by the calculator.

The user can confirm the accuracy of the estimation by the estimator using the categorized display. The analysis assistance device can provide the user with the information useful for optimization of the analysis condition.

(Item 7)

The analysis assistance device according to any one of the items 1 to 6 may further include a measurement quality index display that displays the distribution of the measurement quality index data estimated by the estimator, and in response to a designation operation for an arbitrary point in a distribution image displayed by the measurement quality index display, the comparison outputter may acquire the analysis condition data corresponding to the designated point, and may compare and output the estimated measurement quality index data corresponding to the acquired analysis condition data and the calculated measurement quality index data corresponding to the acquired analysis condition data.

This makes it possible for the user to confirm a relationship between the distribution in the measurement quality index display and the estimated retention time data as well as the calculated retention time data.

(Item 8)

An analysis assistance method according to another embodiment includes:

estimating distribution of measurement quality index data using a plurality of analysis condition data to be provided to an analysis device and a plurality of measurement data obtained in the analysis device based on the plurality of analysis condition data;

calculating the measurement quality index data from the measurement data obtained from the analysis device; and comparing and outputting for display the measurement quality index data estimated by the estimating and the measurement quality index data calculated by the calculating.

(Item 9)

A non-transitory computer readable medium according to another aspect stores an analysis assistance program that causes a computer to execute:

estimation processing of estimating distribution of measurement quality index data using a plurality of analysis condition data to be provided to an analysis device and a plurality of measurement data obtained in the analysis device based on the plurality of analysis condition data;

calculation processing of calculating the measurement quality index data from the measurement data obtained from the analysis device; and comparison outputter processing of comparing and outputting for display the measurement quality index data estimated by the estimation processing and the measurement quality index data calculated by the calculation processing.

While preferred embodiments of the present disclosure have been described above, it is to be understood that variations and modifications will be apparent to those skilled in the art without departing the scope and spirit of the present disclosure. The scope of the present disclosure, therefore, is to be determined solely by the following claims.

I claim:

1. An analysis assistance device comprising a processor configured as an estimator, a calculator, and a comparison outputter, wherein:
    the estimator estimates distribution of measurement quality index data using a plurality of analysis condition data for a same sample to be provided to an analysis device, and a plurality of measurement data obtained in the analysis device based on the plurality of analysis condition data, and which provides an estimated measurement quality index data for the same sample in association with a new analysis condition data different from the plurality of analysis condition data provided to the analysis device, the new analysis condition data being a designated point in the estimated distribution of measurement quality index data;
    the calculator calculates a new measurement quality index data from a new measurement data obtained for the same sample from the analysis device using the new analysis condition data, the new analysis condition data being the designated point in the estimated distribution of measurement quality index data; and
    the comparison outputter compares and displays the estimated measurement quality index data estimated by the estimator in association with the new analysis condition data, and the new measurement quality index data calculated by the calculator from the new measurement data obtained using the new analysis condition data.

2. The analysis assistance device according to claim 1, wherein the comparison outputter compares and outputs probability distribution of the measurement quality index data estimated by the estimator and the new measurement quality index data calculated by the calculator.

3. The analysis assistance device according to claim 1, wherein the analysis device includes a chromatograph,
    the measurement quality index data includes retention time data of each component analyzed in the chromatograph, and
    the comparison outputter compares and outputs the retention time data estimated by the estimator and the retention time data calculated by the calculator.

4. The analysis assistance device according to claim 3, wherein the comparison outputter compares and outputs a peak image of a spectrum representing the retention time data estimated by the estimator and a peak image of a spectrum representing the retention time data calculated by the calculator.

5. The analysis assistance device according to claim 3, wherein the comparison outputter compares and outputs a numeral indicating the retention time data estimated by the estimator and a numeral indicating the retention time data calculated by the calculator.

6. The analysis assistance device according to claim 3, wherein the comparison outputter categorizes and outputs a difference between the retention time data estimated by the estimator and the retention time data calculated by the calculator.

7. The analysis assistance device according to claim 1, further comprising a measurement quality index display that displays the distribution of the measurement quality index data estimated by the estimator, and
in response to a designation operation for an arbitrary point in a distribution image displayed by the measurement quality index display, the comparison outputter acquires the analysis condition data corresponding to the designated point, and compares and outputs the estimated measurement quality index data corresponding to the acquired analysis condition data and the calculated measurement quality index data corresponding to the acquired analysis condition data.

8. An analysis assistance method comprising:
estimating distribution of measurement quality index data using a plurality of analysis condition data for a same sample to be provided to an analysis device, and a plurality of measurement data obtained in the analysis device based on the plurality of analysis condition data, and providing an estimated measurement quality index data for the same sample in association with a new analysis condition data different from the plurality of analysis condition data provided to the analysis device, the new analysis condition data being a designated point in the estimated distribution of measurement quality index data;
calculating a new measurement quality index data from a new measurement data obtained for the same sample from the analysis device using the new analysis condition data, the new analysis condition data being the designated point in the estimated distribution of measurement quality index data; and
comparing and displaying the estimated measurement quality index data estimated by the estimating in association with the new analysis condition data, and the new measurement quality index data calculated by the calculating from the new measurement data obtained using the new analysis condition data.

9. A non-transitory computer readable medium storing an analysis assistance program that causes a computer to execute:
estimation processing of estimating distribution of measurement quality index data using a plurality of analysis condition data for a same sample to be provided to an analysis device, and a plurality of measurement data obtained in the analysis device based on the plurality of analysis condition data, and providing an estimated measurement quality index data for the same sample in association with a new analysis condition data different from the plurality of analysis condition data provided to the analysis device, the new analysis condition data being a designated point in the estimated distribution of measurement quality index data;
calculation processing of calculating a new measurement quality index data from a new measurement data obtained for the same sample from the analysis device using the new analysis condition data, the new analysis condition data being the designated point in the estimated distribution of measurement quality index data; and
comparison outputter processing of comparing and displaying the estimated measurement quality index data estimated by the estimation processing in association with the new analysis condition data, and the new measurement quality index data calculated by the calculation processing from the new measurement data obtained using the new analysis condition data.

* * * * *